United States Patent [19]

Hayden

[11] Patent Number: 5,334,559
[45] Date of Patent: Aug. 2, 1994

[54] PHOSPHATE GLASS USEFUL IN LASERS

[75] Inventor: Joseph S. Hayden, Clarks Summit, Pa.

[73] Assignee: Schott Glass Technologies, Inc., Duryea, Pa.

[21] Appl. No.: 11,653

[22] Filed: Feb. 1, 1993

[51] Int. Cl.$^5$ .......................... C03C 3/17; C03C 3/16
[52] U.S. Cl. ............................................ 501/48; 501/45
[58] Field of Search ...................................... 501/45, 48

[56] References Cited

U.S. PATENT DOCUMENTS

| | | | |
|---|---|---|---|
| 3,979,322 | 9/1976 | Alexeev et al. | 501/45 X |
| 4,022,707 | 5/1977 | Deutschbein et al. | 501/48 X |
| 4,075,120 | 2/1978 | Myers et al. | 501/48 X |
| 4,239,645 | 12/1980 | Izumitani et al. | 501/45 X |
| 4,248,732 | 2/1981 | Myers et al. | 501/45 X |
| 4,333,848 | 6/1982 | Myers et al. | 501/45 X |
| 4,875,920 | 10/1989 | Myers | 501/45 X |
| 4,929,387 | 5/1990 | Hayden et al. | 501/45 X |
| 4,962,067 | 10/1990 | Myers | 501/45 |
| 5,032,315 | 7/1991 | Hayden et al. | 501/45 X |
| 5,053,360 | 10/1991 | Myers et al. | 501/45 X |
| 5,164,343 | 11/1992 | Myers | 501/45 X |
| 5,173,456 | 12/1992 | Hayden et al. | 501/45 |

*Primary Examiner*—Mark L. Bell
*Assistant Examiner*—David Sample
*Attorney, Agent, or Firm*—Millen, White, Zelano, & Branigan

[57] ABSTRACT

A glass consisting essentially of (on an oxide composition basis):

| | Mole % |
|---|---|
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| Sum R'O (R' = Mg, Ca, Sr, Ba, Zn and Pb) | 0–20 |
| Sum $R_2O$ (R = Li, K, Rb, Cs) | 0–18 | wherein $Ln_2O_3$ represents the sum of the oxides of active lasing lanthanides of atomic number 58–71.

9 Claims, 1 Drawing Sheet

PHOSPHATE GLASS USEFUL IN LASERS

BACKGROUND OF THE INVENTION

This invention relates to phosphate laser glasses, typically neodymium-doped.

The term "laser" refers to the amplification of light by the stimulated emission of radiation. In a laser, an active material, for example, a glass suitably doped with an active atomic species such as neodymium, is placed in a cavity resonator formed by two reflecting, or at least partially reflecting, mirrors.

It is known for some time that phosphate laser glasses have a low threshold value for the laser effect, and phosphate glass compositions have been commercially available as optical components for use in laser systems.

Prior art phosphate laser glasses contain a wide variety of components including, for example, $Al_2O_3$, $SiO_2$, alkali metal oxides ($Na_2O$, $K_2O$, $Li_2O$, especially), alkaline earth metal oxides, etc., in addition to the base component, $P_2O_5$. Prior art glasses having laser properties desirable for high energy solid state laser systems are described in U.S. Pat. Nos. 4,075,120; 4,248,732; and 4,239,645.

Other phosphate laser glasses place emphasis on the use of $K_2O$ and BaO to impart pronounced a thermal character to the laser glass. See, e.g., U.S. Pat. No. 4,022,707; U.S. Pat. No. 4,076,541; and U.S. Pat. No. 4,108,673. While other publications require the use of $Li_2O$, e.g., U.S. Pat. No. 4,929,387, and/or MgO, e.g., U.S. Pat. No. 5,032,315, to obtain glasses with exceptional properties for use in high average power laser systems. Still another publication, U.S. Pat. No. 4,333,848, emphasizes the use of $Li_2O$ with BaO to achieve this athermal characteristic in a laser glass.

Still other laser glass publications exist which prescribe the necessary use of $SiO_2$, e.g., U.S. Pat. No. 4,820,662, DE 34 35 133, JP 51-107312, and DE 36 09 247, and/or $B_2O_3$, e.g., U.S. Pat. No. 4,661,284, to obtain improvements in the characteristics desirable in laser glasses for high power solid state laser systems.

Many other laser phosphate publications exist which describe a wide variety of glasses such as JP 49-114615(4), JP 60-191029(3), JP 51-107311, JP 50-3411, JP 51-30812, SU-355,916, U.S. Pat. No. 3,846,142. In these patents, no particular emphasis is placed on alkali metal oxides. Further patents equate all metal oxides, e.g., U.S. Pat. No. 4,120,814, U.S. Pat. No. 3,979,322, U.S. Pat. No. 4,225,459, U.S. Pat. No. 3,580,859, and U.S. Pat. No. 4,470,922.

JP 54-38311 indicates a preference for $Li_2O$, but in phosphate glasses containing components such as CuO and $V_2O_5$.

Integrated optic lasers and amplifiers have been demonstrated in neodymium-doped glasses. These devices have operated near 1057 nm in silicate glasses and 1057 and 1355 nm in phosphate glasses (Sanford et al., Opt. Lett. 15, 366 (1990); Aoki et al., IEEE Photon. Tech. Lett. 2, 459 (1990); and Aoki et al., Elec. Lett. 26, 1910 (1990)).

The wavelength area around 1.3 μm is of particular importance to the telecommunications industry since it is in this wavelength region where commercial transmission fibers are characterized by low optical loss and near zero optical dispersion. Thus, most of the optical fiber communications systems in use presently operate near 1.3 μm, and active devices which function near 1.3 μ are consequently required to act as both laser sources and as optical amplifiers.

Laser action at 905 nm has been realized in neodymium-doped-silica fiber lasers but not in glass integrated optic devices (Poet al., Digest of Annual Meeting of the Optical Society of America, Optical Society of America, paper FD-4 (1986)).

SUMMARY OF THE INVENTION

An object of the invention is to provide a glass composition suitable for the manufacture of waveguide devices, particularly waveguide devices for oscillator lasers or laser amplifiers exhibiting lasing action at about 1.3 μm and/or exhibiting lasing action at multiple levels.

Upon further study of the specification and appended claims, further objects and advantages of this invention will become apparent to those skilled in the art.

A phosphate glass composition has now been discovered that can be used to manufacture waveguides exhibiting advantageous properties. In particular, the glass can be used to form a channel waveguide capable of lasing at three levels, wherein one of the levels is in the region of 1.3 μ. Also, the glass can be used to prepare a channel waveguide which lases at 905 nm.

The invention thus relates to a phosphate glass possessing desirable properties for production of waveguide devices, including functioning oscillator lasers and laser amplifiers.

Thus, the invention relates to a phosphate glass composition wherein the glass consists essentially of (on an oxide composition basis):

|  | Mole % |
| --- | --- |
| $P_2O_5$ | 50–70 |
| $Al_2O_3$ | 4–13 |
| $Na_2O$ | 10–35 |
| $La_2O_3$ | 0–6 |
| $Ln_2O_3$ | >0–6 |
| Sum R'O (R' = Mg, Ca, Sr, Ba, Zn and Pb) | 0–20 |
| Sum $R_2O$ (R = Li, K, Rb, Cs) | 0–18 |

$Ln_2O_3$ represents the sum of the oxides of active lasing species or of the lasing system (e.g., a lasing species/energy transfer species combination), ordinarily selected from the lanthanide elements of atomic number 58–71. Optionally, other lasing species or lasing system combinations can be employed including transition metals like chromium and vanadium, which have broad and intense absorption bands and resultant co-dopant fluorescent bands which overlap with the primary lasing ion absorption levels. See, e.g., *Physics of Laser Fusion*, Volume IV, "The Future Development of High-Power Solid State Laser Systems." Although generally the amount of the lasing species/lasing system is 0.01–6 mole % in total, the amount can be optionally higher, e.g., up to 10% or even up to 20% or higher in total. The preferred active lasing species are $Nd_2O_3$ and $Pr_2O_3$.

BRIEF DESCRIPTION OF THE DRAWINGS

Various other objects, features and attendant advantages of the present invention will be more fully appreciated as the same becomes better understood when considered in conjunction with the accompanying drawing, in which like reference characters designate the same or similar parts throughout the several views, and wherein.

DETAILED DESCRIPTION

Figure 1:
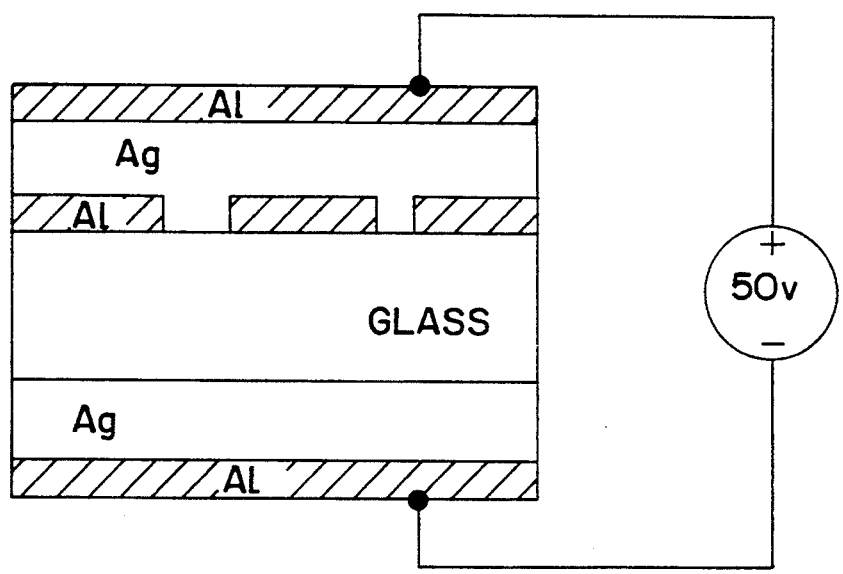
FIG. 1 is an illustration of silver-for-alkali ion exchange by electric field-assisted migration.

Phosphate glass was selected due to ease of preparation and the good laser properties. The only other commonly available glasses are silicates. However, 1.3 $\mu$ lasing is not possible with silicate glasses due to the phenomena of excited state absorption (ESA). See S. Zemon et al., IEEE Phot. Tech. Lett. 4(3), 244 (1992).

Thus, the glass compositions employ $P_2O_5$ as the principle glass former. Generally, the $P_2O_5$ content is 50–70, e.g., 60 mole %. The $P_2O_5$ content can also be defined in terms of, for example, 51, 52, 53, 54, 56, 57, 58, 59, 61, 62, 63, 64, 65, 66, 67, 68 and 69 mole %.

$Al_2O_3$ is added chiefly for durability since phosphates are normally attacked by molten salt baths and other processing chemicals used in waveguide preparation procedures (i.e., to remove ion diffusion barriers). The level of $Al_2O_3$ is generally 4–13%. Other levels of $Al_2O_3$ are 5, 6, 7, 8, 9, 10, 11 and 12 mole %.

Additional durability enhancing agents can be selected from the R'O components provided they are not present in levels which hinder the silver-for-alkali exchange process used for forming a waveguide.

The R'O components, MgO, CaO, SrO, BaO, ZnO and PbO, are thus useful in substrate materials for fabrication of waveguide structures, especially channel waveguide structures, which can then function as integrated optic laser oscillators and amplifiers.

The total amount of R'O components is generally 0–20 mole %. Other levels of R'O are 1, 2, 3, 4, 5, 6, 7, 8, 9, 10, 11, 12, 13, 14, 15, 16, 17, 18 and 19 mole %.

Sodium is used because it is very mobile (alkalis have high diffusion rates). Since the ionic size of Na is similar to silver, it exchanges well with silver (in comparison to other alkali ions). Generally, the $Na_2O$ content is 10–35 mole %, e.g., 24 molt %. The $Na_2O$ amount can also be, for example, 11, 12, 13, 14, 15, 16, 17, 18, 19, 20, 21, 22, 23, 24, 25, 26, 27, 28, 29, 30, 31, 32, 33 or 34 mole %.

The alkali components, other than sodium, i.e., $R_2O$ ($Li_2O$, $K_2O$, $Rb_2O$, and $Cs_2O$), can also be used in substrate materials. The level of $R_2O$ is generally 0–18 moles, e.g., 1, 2, 3, 4, 5, 6, 7, 8, 9, 10, 11, 12, 13, 14, 15, 16 or 17 mole %.

The amount of a lasing species or lasing system (e.g., a lasing species/energy transfer species combination) present in the glass is effective for lasing, generally >0–6 mole %, e.g., 0.01–6 mole % (on an oxide basis); however, the amount of these species can be optionally higher, e.g., up to 10% or even up to 20% or higher in total. The lasing species, Ln, can be, e.g., Nd, Pr, Pm, Sm, Eu, Tb, Ho, Er, Yb, etc., or combinations of these species in which one or more lanthanide ion acts to sensitize the lasing activity of one or more other lanthanide ions in the glass. Optionally, other lasing species or lasing system combinations can be employed including transition metals like chromium and vanadium, which have broad and intense absorption bands and resultant co-dopant fluorescent bands which overlap with the primary lasing ion absorption levels. See, e.g., *Physics of Laser Fusion*, Volume IV, "The future Development of High-Power Solid State Laser Systems." The preferred lasing species of this invention are Nd and Pr.

For example, $Nd_2O_3$ or $Pr_2O_3$, the most preferred lasing species, is added to the glasses in sufficient quantity to achieve the desired lasing activity, as is true for other lasing species and systems. For example, the glass can contain 0.01, 0.03, 0.05, 0.07, 0.08, 0.1, 0.3, 0.5, 0.7, 0.8, 1.0, 1.3, 1.5, 1.8, 2.0, 2.1, 2.3, 2.5, 2.7, 2.9, 3.0, 3.1, 3.3, 3.5, 3.7, 3.9, 4.0, 4.1, 4.3, 4.5, 4.7, 4.9, 5.0, 5.1, 5.3, 5.5, 5.7 or 5.9 mole % of $Ln_2O_3$.

Neodymium is the leading ion known for lasing in the region of 1.06 $\mu$ in glass. Other ions (and combinations of ions) and wavelength combinations are also of interest such as neodymium for use at approximately 0.9 $\mu$ and 1.3 $\mu$; Pr at approximately 1.3 $\mu$; Yb and Er, as a sensitizing ion and lasing ion, respectively, in combination for use at approximately 1.5 $\mu$. Neodymium and praseodymium are the leading ions for lasing in the region of 1.3 $\mu$.

Addition, of $La_2O_3$ allows direct substitution of $Nd_2O_3$ or other lasing or energy transfer lanthanide species by another oxide which is nearly an exact structural replacement of, e.g., $Nd_2O_3$. This allows the manufactured glass to be produced with a broad range of neodymium or other lasing species doping levels while minimizing the change from this adjustment on the physical, optical, and thermal properties of the produced glasses. Thus, $La_2O_3$ amounts typically are 0–6 mole %, for example, 0.1, 0.2, 0.3, 0.5, 0.7, 0.9, 1.0, 1.2, 1.4, 1.6, 1.8, 2.0, 2.2, 2.3, 2.4, 2.5, 2.6, 2.7, 2.8, 2.9, 3.0, 3.2, 3.4, 3.6, 3.8, 3.9, 4.0, 4.2, 4.4, 4.6, 4.8, 5.0, 5.2, 5.4, 5.6 or 5.8 mole %.

Other conventional additives are to be avoided, chiefly elements such as refining agents (i.e., $As_2O_3$ and $Sb_2O_3$) and antisolarants ($Sb_2O_3$ and $Nb_2O_5$) which can, during ion exchange of alkali for silver, generate silver metal colloidal particles in the glass which leads to a waveguide exhibiting high loss (absorption) and poor optical quality (scattering centers).

The laser phosphate glass composition described above is useful for the preparation of a glass optical waveguide which can then, in turn, be used in, e.g., optically pumped lasers. For example, the glass could be used to provide a plate waveguide wherein a certain region of the glass plate is treated (e.g., by ion exchange) to provide regions having different refractive indexes such that light will be guided through a specific region of the glass plate.

These waveguides can be fabricated by a variety of means in which silver is preferentially substituted for sodium and, to some extend, other alkali ions in the glass through techniques such as molten salt bath ion exchange and electric field-assisted migration from solid silver films. Ion exchange is conducted at elevated temperatures, e.g., about 350° C. Additionally, techniques in which the glass is used as a sputtering target to be deposited onto a suitable substrate such as another glass can be used to form optical waveguides. Ion exchange from silver films is attractive for integrated optic waveguide fabrication since it is a dry process which does not use molten salts.

Channel waveguide structures are prepared by analogous techniques in which portions of the substrate are protected with a barrier, e.g., aluminum or a photoresist, which acts to block the silver-for-alkali exchange process so that the localized refractive index of the exchanged region differs from the surrounding substrate glass, thus leading to the effect of waveguiding.

For example, in the molten salt bath technique, a glass is provided with a single aluminum film into which apertures have been opened by standard photolithographic techniques. The glass is then immersed in a molten bath of, e.g., silver nitrate whereby ion exchange occurs to obtain the desired waveguiding properties.

In the electrical field-assisted migration procedure, the top surface of a glass wafer can be provided with, for example, an aluminum film which is then treated by standard photolithographic techniques to provide the aluminum film with apertures. A silver film is deposited on the aluminum film and then another aluminum film is provided on top of the silver film. A silver film and an aluminum film are then applied to the bottom surface of the wafer. Ion exchange is achieved by applying an electric field across the wafer, e.g., 50 V at about 350° C. The treated wafer can then be annealed and the metal films removed.

Following silver-for-alkali ion exchange to achieve waveguiding properties, the glass can be cut into sections, e.g., about 1 cm long, and the end faces given an optical polish. Mirrors can then be attached and the resultant optical waveguide device can be employed in, e.g., an optically pumped laser.

Of course, as is clear from the foregoing discussion, the glasses of this invention are completely compatible with current state-of-the-art manufacturing methods for phosphate laser glasses. The melting, refining, homogenizing and casting of these glasses can be accomplished using the current standard procedures employed by the glass industry. The glasses of this invention can be formed into slabs, rods, discs, fibers, and other shapes required by the laser community and others by conventional forming techniques well known in the glass industry.

The glasses of this invention can be fully conventionally prepared by mixing the appropriate amounts of each constituent to form a batch composition which is then charged into a fused silica crucible and melted by induction heating from, e.g., 1100° C. to as much as 1500° C., depending on the chosen composition. The glass can then be refined at temperatures exceeding, e.g., 1300° C. from typically 2 to 4 hours, again depending on composition and melt viscosity, with equal intervals of gas bubbling and stirring. The glass is then typically cast into steel molds and annealed at the transformation temperature plus about 20° C. for about 2 hours followed by cooling at about 30° C./hour. These procedures were followed in the examples below.

As noted above, the examples of this application are melted in a fused silica crucible. Under such melting conditions, as is well known, there will be some silica added from the crucible to the final glass composition. Accordingly, whereas all compositions given in this disclosure refer to the component contents as added to the batch as is conventional (batch compositions), where a fused silica crucible is employed, the final composition will contain some silica, regardless of whether $SiO_2$ is added as a batch component. This conventional difference from the initial batch composition is analogous to other differences between final glass compositions and batch compositions, e.g., due to the volatilization of ingredients, etc. The amount of silica will generally be no more than about 3.5, 3, 2.5, 2, 1.5, 1, 0.5 mole %, etc., especially not more than about 3 mole % and most especially not more than about 2 mole % (all on a renormalized basis). In a preferred aspect of this invention, the final composition contains no more than 3 mole % silica, especially not more than 2 or 1 mole silica (on the mentioned basis) due to the effect of silica dissolution from the crucible. Of course, where a nonsilica-containing crucible is employed, this effect will not occur.

The silica contribution from the crucible will vary conventionally with melt temperature and melting time. For example, in a melt of about 2 hours at a temperature of about 1300° C., about 2 wt.% of silica will be contributed from a quartz crucible, the precise amount being determined by the precise conditions involved such as glass volume exposed, crucible surface area, glass composition, degree of agitation in the melt, etc.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications cited above are hereby incorporated by reference.

EXAMPLE

A phosphate glass was prepared in accordance with the following composition:

| Oxide | Mole % | Wt. % |
| --- | --- | --- |
| $P_2O_5$ | 60.00 | 69.28 |
| $Na_2O$ | 24.00 | 11.93 |
| $Al_2O_3$ | 13.00 | 10.78 |
| $La_2O_3$ | 2.25 | 5.96 |
| $Nd_2O_3$ | 0.75 | 2.05 |

Arsenic trioxide ($As_2O_3$) is usually added to glass during melting to remove bubbles and occlusions. However, arsenic trioxide also acts as an electron donor which reduces the silver ions in the waveguide region to elemental silver (Findakly, Opt. Eng. 24, 244 (1985)). The reduced silver leads to optical absorption and scattering which limit the usefulness of silver ion-exchanged devices. Thus, the above glass composition contains no arsenic trioxide or other refining agents.

The glass was cut into 35 mm×35 mm×2 mm wafers, and the top surface was polished. A 150 nm thick aluminum film was deposited onto the top surface of the wafer. Apertures ranging from 3 μm to 8 μm were opened in the film by photolithography and wet chemical etching. A 1 μm thick silver film was deposited on top of the first aluminum film, which was followed by another 150 nm thick aluminum film. A 1 μm silver film and a 150 nm aluminum film were deposited on the backside of the wafer.

The ion exchange was performed by applying 50 V across the wafer at 350° C. The exchange was performed for 20 minutes. The device is shown in FIG. 1. The wafer was then annealed at 350° C. for another 10 minutes without the electric field. The metal films were removed, the wafer was diced into small chips, and the endfaces were polished.

Optical losses of the 1.4 cm long device were measured using the optimum coupling technique (Haruna et al., Elec. Lett. 28, 1612 (1992)). The measured loss was not more than 0.5 dB/cm. Dielectric mirrors were then attached to the device with small clips. The device was end-pumped with a CW titanium-sapphire laser. The lasing spectra were recorded with an automated spectrometer with 0.2 nm resolution. The 1356 nm laser spectrum was recorded with 240 mW of absorbed pump power at 794 nm. Transient lasing was also observed at 1328 nm. Broad fluorescence centered at 1320 nm was recorded indicating a reduction of ESA. The lasing threshold for 905 nm emission was 170 mW of absorbed pump power. The threshold for 1057 nm emission was 12 mW of absorbed pump power using a 4% output coupler. 56% slope efficiency was recorded at 1057 nm when using a 20% output coupler. The maximum output power at 1057 nm was 210 mW.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A glass consisting essentially of:

|  | Mole % |
|---|---|
| $P_2O_5$ | 50–70 |
| $Al_2O_3$ | 4–7 |
| $Na_2O$ | 10–35 |
| $La_2O_3$ | 0.1 |
| $Ln_2O_3$ | >0–1.5 |
| Sum R'O | 0–20 |
| (R' = Ca, Sr, Ba, Zn and Pb) | |
| Sum $R_2O$ | 0–18 |
| (R = K, Rb and Cs) | | wherein
$Ln_2O_3$ represents the sum of the oxides of active lasing lanthanides of atomic number 58–71, the amount of MgO is 0, and the amount of $Li_2O$ is 0.

2. A glass according to claim 1, wherein said glass consists essentially of $P_2O_5$, $Na_2O$, $Al_2O_3$, $La_2O_3$, and $Nd_2O_3$.

3. A glass consisting essentially of:

|  | Wt. % |
|---|---|
| $P_2O_5$ | 69.28 |
| $Na_2O$ | 11.93 |
| $Al_2O_3$ | 10.78 |
| $La_2O_3$ | 5.96 |
| $Nd_2O_3$ | 2.05, | wherein
the MgO content is 0, and
the $Li_2O$ content is 0.

4. A glass according to claim 1, wherein said glass consists essentially of $P_2O_5$, $Na_2O$, $Al_2O_3$, $La_2O_3$, and $Pr_2O_3$.

5. A glass consisting essentially of (on an oxide composition basis):

|  | Mole % |
|---|---|
| $P_2O_5$ | 50–70 |
| $Al_2O_3$ | 12–13 |
| $Na_2O$ | 10–35 |
| $La_2O_3$ | [0–6] 0.1–6 |
| $Ln_2O_3$ | [>0–6] >0–1.5 |
| Sum R'O | 0–20 |
| (R' = [Mg,] Ca, Sr, Ba, Zn and Pb) | |
| Sum $R_2O$ | 0–18 |
| (R = [Li,] K, Rb and Cs) | | wherein
$Ln_2O_3$ represents the sum of the oxides of active lasing lanthanides of atomic number 58–71,
the MgO content is 0, and
the $Li_2O$ content is 0.

6. A glass according to claim 5, wherein said glass consists essentially of $P_2O_5$, $Na_2O$, $Al_2O_3$, $La_2O_3$ and $Nd_2O_3$.

7. A glass according to claim 5, wherein said glass consists essentially of $P_2O_5$, $Na_2O$, $Al_2O_3$, $La_2O_3$ and $Pr_2O_3$.

8. A glass according to claim 1, wherein the sum of R'O is 0–20 mole % and R' is Ca, Sr, Zn and Pb.

9. A glass according to claim 5, wherein the sum of R'O is 0–20 mole % and R' is Ca, Sr, Zn and Pb.

* * * * *

UNITED STATES PATENT AND TRADEMARK OFFICE
CERTIFICATE OF CORRECTION

PATENT NO. : 5,334,559
DATED : August 2, 1994
INVENTOR(S) : Joseph S. HAYDEN

It is certified that error appears in the above-indentified patent and that said Letters Patent is hereby corrected as shown below:

Claim 1, Column 7, Line 24: After of delete ":" and insert - - (on an oxide composition basis): - -

Claim 1, Column 7, Line 30: Reads.. 0.1 Should read - - 0.1-6 - - .

Claim 5, Column 8, Line 23: Delete "[0-6]".

Claim 5, Column 8, Line 24: Delete "[>0-6]".

Claim 5, Column 8, Line 25: Delete "[Mg,]".

Claim 5, Column 8, Line 27: Delete "[Li,]".

Signed and Sealed this

Thirteenth Day of December, 1994

Attest:

BRUCE LEHMAN

*Attesting Officer*  *Commissioner of Patents and Trademarks*